United States Patent [19]

Smith et al.

[11] 4,434,549
[45] Mar. 6, 1984

[54] METHOD OF MAKING AN IMPROVED PYROELECTRIC SENSOR

[75] Inventors: Peter R. Smith, Littleton; Charles Coleman, Lakewood, both of Colo.

[73] Assignee: Statitrol, Inc., Lakewood, Colo.

[21] Appl. No.: 431,002

[22] Filed: Sep. 30, 1982

Related U.S. Application Data

[62] Division of Ser. No. 205,146, Nov. 10, 1980, Pat. No. 4,379,971.

[51] Int. Cl.$^3$ .............................................. H05K 3/30
[52] U.S. Cl. ........................................ 29/832; 29/573
[58] Field of Search ........................ 29/572, 573, 832; 250/338, 340, 342, 370, 371

[56] References Cited

U.S. PATENT DOCUMENTS

| | | | |
|---|---|---|---|
| 2,392,873 | 1/1946 | Zahl | 250/342 |
| 3,452,198 | 6/1969 | White | 250/338 X |
| 3,707,695 | 12/1972 | Yamaka | 250/338 X |
| 3,839,640 | 10/1974 | Rossin | 250/353 |
| 3,842,276 | 10/1974 | Southgate | 250/370 X |
| 3,985,685 | 10/1976 | Houlton et al. | 250/338 X |
| 4,081,680 | 3/1978 | Keller | 250/338 X |
| 4,225,786 | 9/1980 | Perlman | 250/349 X |
| 4,271,358 | 6/1981 | Schwarz | 250/338 |
| 4,367,408 | 1/1983 | Imai et al. | 250/338 |
| 4,383,174 | 5/1983 | Matsumura et al. | 250/338 |

FOREIGN PATENT DOCUMENTS 55-39082  3/1980  Japan ................................. 250/338

Primary Examiner—Howard N. Goldberg
Assistant Examiner—Carl J. Arbes
Attorney, Agent, or Firm—James E. Pittenger

[57] ABSTRACT

An improved, selective, radiation sensing device is provided which includes a thin strip of pyroelectric material. One side of the material is coated with a continuous layer of metallic material to form an electrode while the opposite side is coated with at least a pair of electrodes and the output of the electrodes are electrically connected to a differential amplifier. A layer of energy filter material is applied over the continuous electrode. This layer is transparent to all energy outside of a desired energy frequency band to which the device is to be sensitive but absorbs and converts to heat all energy applied which is within this band. This heat is conducted quickly into the pyroelectric material which produces a voltage change in the output from the corresponding electrodes. By positioning the device at the focal point of a concave mirror, the output from the electrodes can be used to energize an alarm signal or the magnitude and frequency of the output of the device can indicate the size and movement of an energy source such as a human body. A novel method of making the device is included which facilitates the fabrication and reduces handling problems and costs.

4 Claims, 8 Drawing Figures

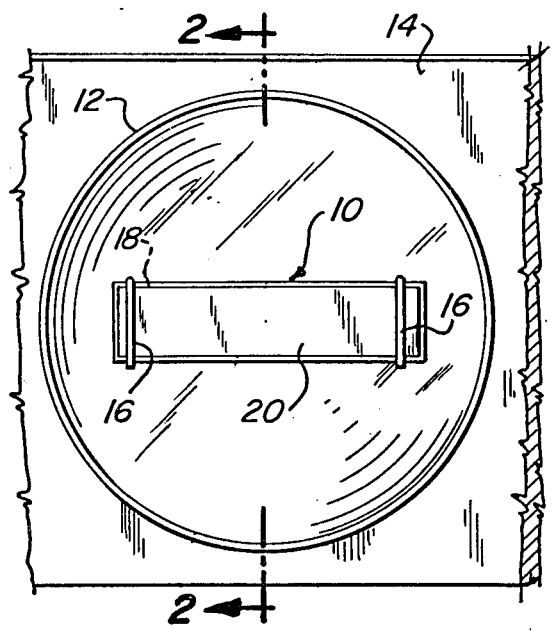
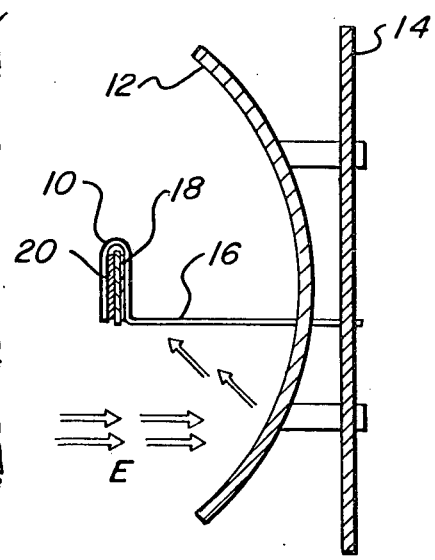
Fig_1    Fig_2
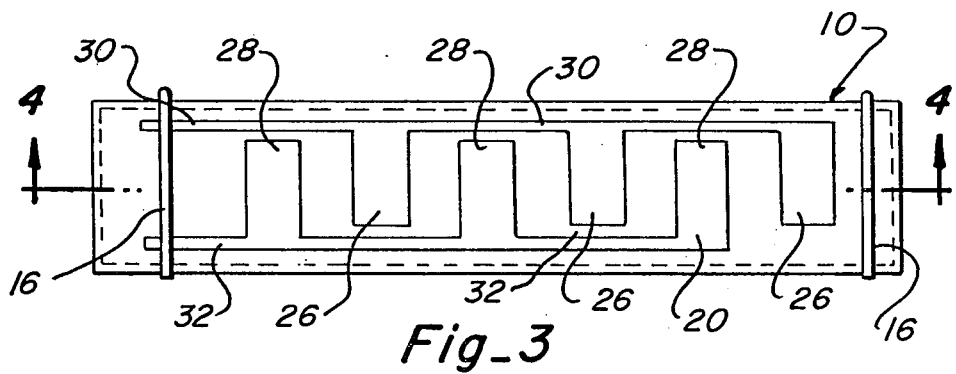
Fig_3
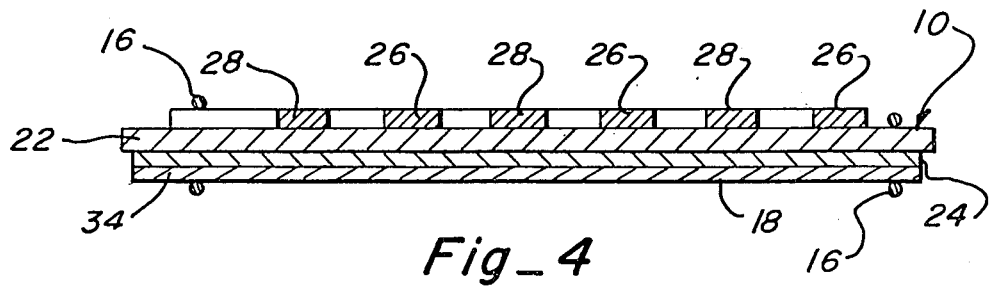
Fig_4

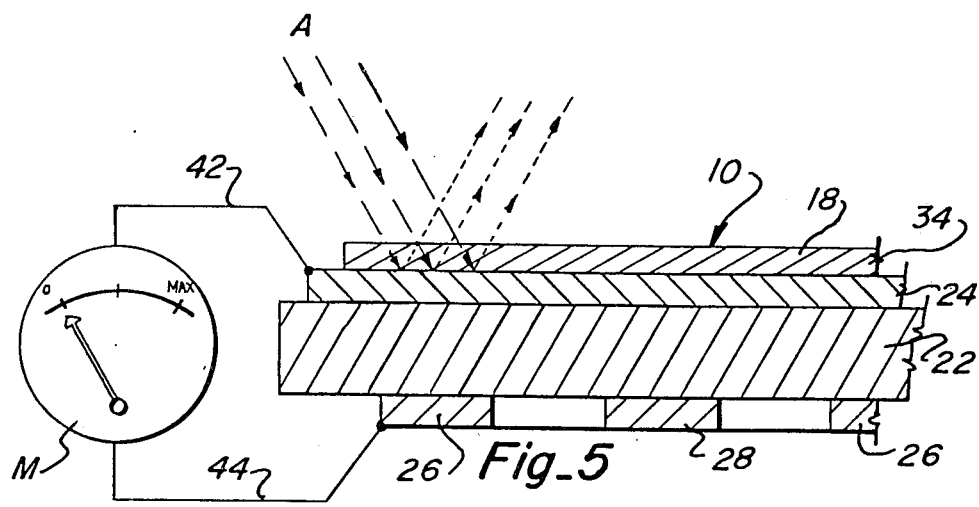
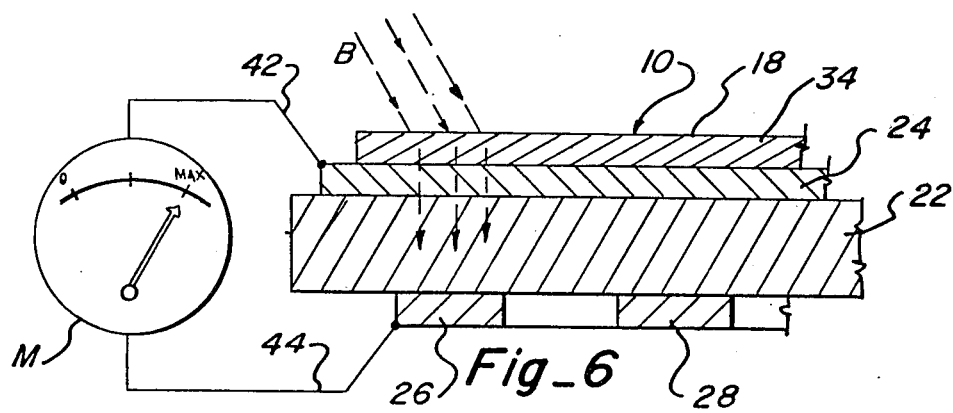
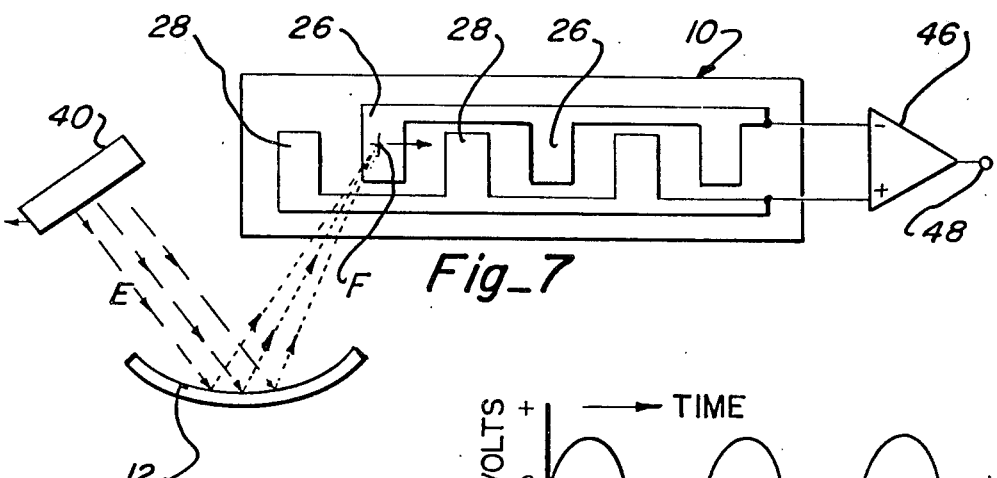
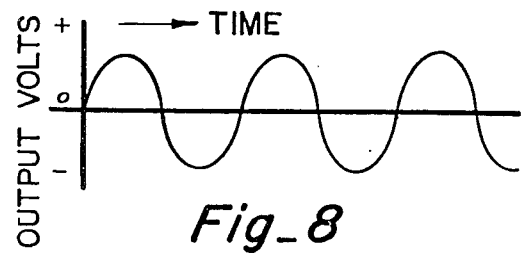

METHOD OF MAKING AN IMPROVED PYROELECTRIC SENSOR

This is a division of application Ser. No. 205,146, filed Nov. 10, 1980 now U.S. Pat. No. 4,379,971 issued Apr. 12, 1983.

DESCRIPTION

TECHNICAL FIELD

This invention is directed to a low cost pyroelectric detector which can be easily manufactured and used for the sensing of electromagnetic radiation. More specifically, it is directed to an improved infrared sensor which utilizes both a thin pyroelectric sheet material as the sensing media and may use a coating material as a selective filter for the sensing of a desired narrow band of radiation.

BACKGROUND ART

In recent years the development and improvement of radiation sensors has been receiving considerable attention. It has been commonly found that most radiation sensors which are directed primarily to radiation in the infrared range utilize expensive and technically complex methods for selectively choosing the desired band width of the radiation which is to be sensed by the detector.

With the advent of intrusion detectors which are becoming more and more popular, it has been found that the public is in need of a low cost detector which can provide the desired alarm and protection and still be within the reach of the pocketbook of the average citizen. Up to now the radiation sensors which have been utilized for this purpose have required exotic structures which cost a considerable amount of money to produce.

One of the present techniques employs a crystalline filter placed between the infrared source and the sensor. These crystalline filters are typically a germanium or silicon substrate upon which thin layers of other optical materials are deposited. The property of these thin layers and substrates are controlled to give the entire filter the desired band pass and band rejection characteristics desired. The difficulties with these types of filters are that the deposition of a thin layer of material, which is usually metallic, onto the necessary substrate is a costly and time consuming process. In addition, the substrate materials are fragile and difficult to handle with considerable breakage resulting during manufacture. In addition, the raw materials which are used in fabricating these filters are relatively costly.

Another technique which is used with radiation detectors is specially treated mirrors to concentrate the radiation and to reflect only the desired wavelengths of the radiated energy onto the sensor. At present, these filtering mirrors are made by depositing a selective reflective material onto the mirror surface. These mirrors have proven unsatisfactory because of the difficulty which has been found in developing satisfactory reflective coatings with the desired band pass and band rejection characteristics.

Another problem occurs when the ambient temperature surrounding the detector changes which can produce false output signals from the sensor which in turn can be misinterpreted. It is highly possible that these ambient changes can sometimes be larger than temperature changes from a desired signal source. This condition, instead of producing false signals, can produce no detectable signal at all rendering the sensor unusable. It is a definite advantage that the sensor not respond to ambient temperature changes and still provide an output from desired radiated energy. Previously, various arrangements have been tried to minimize these conditions through the structure of the sensor itself or by compensation within the electronics which receives the output voltage signal from the sensor. An alternative that has been used in the past is to mount the sensor on a heat sink having a large mass to prevent rapid or sudden temperature changes.

As can be seen, many problems have occurred in the past with these types of sensors and the improvements and modifications which have been made up to this point have been primarily intended to overcome or minimize some of these recurring problems.

PRIOR ART STATEMENT

The following are the most pertinent prior art patents with respect to the present invention which are known to the inventors.

The patent to Zahl (U.S. Pat. No. 2,392,873) discloses an infrared or heat sensor called a thermopile which is placed at the focal point of a parabolic reflector or mirror. The parallel radiation which is received by the parabolic reflector is focused into and concentrated on the thermopile so that changes in temperature in the area in front of the mirror can be detected. FIG. 4 shows this arrangement in detail.

In the patent issued to Houlton, et al (U.S. Pat. No. 3,985,685) a pyroelectric infrared device is disclosed which is typical of these types of devices. A pyroelectric material is sandwiched between two continuous electrodes which senses the charge which is created on the surface of the pyroelectric material by the change in temperature. The output signals from the device are fed to an amplifier which in turn is processed by a conventional processing circuit. In this way, the presence of infrared radiation is sensed.

The patent to Keller (U.S. Pat. No. 4,081,680) reveals an infrared radiation burglar detector which shows the use of a filter which filters out extraneous radiation and allows only the passage of the infrared radiation of the desired wavelength. It has been known in the prior art to utilize a filter which permits only the passage of energy within the desired frequency band which is intended to be sensed. This arrangement is directly opposite to the novel provisions which are disclosed in the present invention.

The patent to Southgate (U.S. Pat. No. 3,842,276) discloses the use of an alternating electrode arrangement on the opposed surfaces of the pyroelectric detection material to produce ambient temperature compensation in the sensing device. In this way, changes in the ambient temperatures can be cancelled to substantially allow the device to be insensitive to changes in the ambient environment. The use of the alternating electrodes permits the alternating polarization of the device which provides this cancellation effect.

SUMMARY OF THE INVENTION

A pyroelectric detector is comprised of a body of pyroelectric crystalline material having a pair of conductive electrodes attached to opposite sides. This crystalline material is electrically polarized and can exhibit temperature change effects by a change in the electrical charge which is present on the skin or surface of the material. This change in electrical charge can be measured and thus, indicate a localized temperature change in the material. In this way, the pyroelectric detector has the function of a capacitor in which an energy charge, and thus a voltage charge, appears when the temperature of the material is changed even to a very minor extent. Various materials have been known to exhibit this electrical change in response to temperature. Some of the materials which exhibit these properties are niobate glycinium sulfate, lead titanate, strontium barium niobate, triglycine fluorberyllate, polyvinylidene fluoride, etc.

One of the convenient characteristics of polyvinylidene fluoride (PVDF2) is that it not only exhibits the pyroelectric characteristics but it also has the ability to be produced in thin film or sheet form to reduce the mass and cost of the overall sensor. In addition, it is highly sensitive to minute and rapid surface temperature changes and can demonstrate transparent qualities with all other wavelengths of radiation except for a particular band of infrared radiation.

Through experimentation it was found that polyvinylidene fluoride is ideal for heat sensing use and can be utilized to a great advantage in order to provide a radiation sensor wherein the range of radiation detected can be precisely selected. In accordance with the present invention, a thin pyroelectric sheet is coated on one of its major surfaces with a pattern of metallic electrode material which is arranged in alternating series fashion as will be described later. On the opposite surface of the pyroelectric material, a metallic continuous electrode material is deposited on the pyroelectric material to perform two functions. One is to provide an electrical connection with the surface of the pyroelectric material to sense the electrical charge thereon. The other is to provide an electrostatic Faraday shield for dissipating static electricity which might interfere with the operation of the sensor and the associated electronic circuitry.

Next, the outer surface area of the continuous metallic electrode is at least partially coated with a thin layer of material which forms the selective radiation absorbing layer. Although the continuous electrode can be completely coated it is also possible to change the operating characteristics of the sensor by selectively coating only certain areas of the surface of the electrode. For example, these areas could correspond with the individual electrode areas on the reverse side. In operation the sensor which is formed in an elongated flexible configuration is mounted at the focal point of a circular concave mirror or other focusing device so that the infrared rays are concentrated onto the outer or front surface of the selective absorbing layer of material. The continuous metallic electrode is additionally grounded to the electrical circuitry and housing for the device for static electricity shielding while the individual alternating electrodes on the back of the sensor are connected to the separate inputs of a differential amplifier which is utilized to null the overall changes in ambient temperature surrounding the sensing device. Thus, electronically the output signals from the sensor are compensated to eliminate the effects of any overall extraneous temperature changes or acoustic or electrostatic interference.

Any electromagnetic radiation not within the absorbing range of the selective absorbing material which strikes the outer surface of the selective radiation absorbing layer passes through the layer and strikes the surface of the metallic electrode. It is desirable that the electrode outer surface be bright or polished so that it in turn will act as a reflector for reflecting the radiation back through the outer layer to be dissipated in the surrounding space. In this way, no significant temperature changes take place at the surface of the sensor and no change in the electrical signal at the sensor output is present.

Any electromagnetic radiation energy which strikes the outer absorption layer which is within the selected absorption range of that material will be absorbed and the electromagnetic radiation will be converted to heat. This heat energy will be conducted from the absorption layer directly through the metallic electrode to the pyroelectric material. This conducted heat will be localized and transmitted quickly into the material adjacent to the front surface area on which it is being applied. In this way, the portion of the pyroelectric material in which the heat energy is being received will experience a temperature change which can be sensed by a localized change in the electrical surface charge on the pyroelectric material. This change in the electrical charge between the corresponding rear electrode contiguous to the heated area and the continuous electrode is sensed by the electronic circuitry which will indicate the presence of an electromagnetic radiation that is within the selected frequency range.

By arranging a number of small electrode areas on the rear surface of the pyroelectric material so that adjacent areas are alternately connected to two or more separate electronic circuits, the individual circuits can be connected to the input of at least one differential amplifier or other suitable electronic device. In this way, a differential sensor array is formed. This circuit provides the temperature compensation required for nulling the changes in ambient temperature which has been mentioned above. In contrast, however, as an electromagnetic energy source moves past the view of the stationary concave reflector and sensor, the focused radiation moves across the face of the absorbing layer generating an alternating polarity voltage signal from the differential amplifier.

The grounding of the continuous front electrode provides the necessary shielding against radio frequency interference, static electricity and electromagnetic interference which can substantially interfere with the operation of a sensor of this type and its associated high impedence circuits. This shielding effectively takes place when the entire sensor is mounted within an electrically conductive enclosure and the enclosure is grounded to the shielding continuous electrode of the sensor. In this way, extraneous electrostatic charges are completely shunted so as not to create noise and erratic output from the sensor which can effect the electrode output circuit.

Although in this disclosure reference may be made specifically to an electromagnetic wavelength which is within the range of a desirable infrared spectrum, it is to be understood that a sensing device using the principle of this invention can be designed to accommodate any particular radiation wavelength range which is desired to be detected. It is merely necessary to utilize a suitable absorption layer material to accomplish this desired selecting process. The significance of the present invention is quite unique from the standpoint that all other radiation detectors use the opposite principle of allowing the passage of only the desired wavelength of radiation while the present invention reflects away the undesired wavelengths and absorbs only the desired energy. This new arrangement provides novel results which heretofore have not been recognized or appreciated.

Even the method of constructing the sensor according to the present invention is unique. Because of the difficulty in handling the fragile sensor of the present invention which is fabricated from an extremely thin film material it has been found desirable to produce the sensors according to this invention in a large number produced on a single sheet. After the metallic electrodes are vacuum deposited or coated on the respective surfaces of the pyroelectric material the front electrode is covered with the absorption coating.

A separate sheet of sensor holders is molded as an integral matrix having the same number of holders which correspond with the number of sensors formed on the single sheet. It has been found that the simultaneous manufacture of sixty sensors and sensor holders as a unit is satisfactory. For the purpose of this application the term matrix is used here to identify a molded sheet of a number of interconnected identical holders which can be later separated.

The individual sensor holders are molded from a suitable plastic material and formed in the shape of elongated rectangles having an open center slot. The material used can be electrically conductive if it is desired to use the holder as part of the shield as explained below. The sides of the center slot are beveled so that the surfaces diverge toward the front with the sensor material mounted on the back surface of the holder with the absorption layer towards the open slot. Once the manufacture of the sheet of multiple sensors has been completed the appropriate surface of the matrix is coated with an adhesive and the sensor sheet is precisely positioned and attached to the matrix in a taut condition so that the individual sensors are aligned with the slotted openings in each holder.

After the adhesive is set, the individual sensors and holders are severed from the matrix to form an individual sensor unit. The individual sensor unit is then inserted into a cartridge which is adapted to receive the holder with a molded catch holding the sensor holder in secure alignment and position. The cartridge is molded from an electrically conductive plastic material which forms part of the electrostatic shield. The end of the cartridge is secured to the edge of the electronic circuit board for the detector and the elements of the sensor are connected to the board by the use of "Z" type compression connectors positioned between the corresponding connectors on the sensor and the circuit board. In this way, when the sensor holder and cartridge are attached to the circuit board the electronic circuit is automatically connected.

Thus, a rigid and permanently connected infrared sensor is physically mounted and electrically connected to the circuit board upon which the corresponding electronic components are mounted to form a complete electronic unit. In this way, a simple and easily manufactured energy sensor is fabricated and mounted with a minimum of difficulty and no physical contact of the thin film materials. Thus, the sensor is easily handled with a minimum of damage to the structure of the device.

Other features and advantages of the present invention will become apparent from the following detailed description of the invention when considered in conjunction with the accompanying drawings.

BRIEF DESCRIPTION OF THE DRAWINGS

FIG. 1 is a front view of the sensor according to the present invention mounted at the focal point of a reflective circular mirror which in turn is mounted on a support structure;

FIG. 2 is a side elevation view taken along lines 2—2 of FIG. 1;

FIG. 3 is a rear view of a sensing device according to the present invention showing the alternating electrode array mounted on the rear surface of the pyroelectric material;

FIG. 4 is a cross-sectional view taken along lines 4—4 of FIG. 3;

FIG. 5 is a pictorial enlarged cross-section of the sensor according to the present invention which shows the unwanted radiation being reflected away;

FIG. 6 is a pictorial enlarged cross-section of the sensor according to the present invention which shows the absorption of the desired radiation and the symbolic generation of the resulting electrical signal;

FIG. 7 is a pictorial presentation of the arrangement utilizing the sensor of the present invention in which the concentrated energy is shown to be focused on the sensor so as to generate the electrical signal from only one set of corresponding electrodes; and FIG. 8 shows a graph displaying the typical electrical output from the differential amplifier of the present invention when the selected energy being received is moved across the face of the sensor.

DETAILED DESCRIPTION

Turning now more specifically to the drawings, FIG. 1 shows a pictorial display of a dish type circular mirror 12 supported on a mounting surface 14. The mounting surface 14 could be of any suitable support but most likely would be a printed circuit board which would contain the components (not shown) for the electronic circuit which is utilized with the improved pyroelectric sensor of the present invention.

Mounted or suspended within the inside curvature of the circular mirror 12 is the pyroelectric sensing device 10 which is an important part of this invention. The sensor 10 is mounted at the focal point of the circular mirror 12 in a suspended arrangement such as provided by a pair of clip type support wires 16. The outer end 18 of the support wires 16 can be bent in a U-shaped configuration which is set perpendicular to the axis of the support clips 16. In this way, the sensor can be supported at each end in a flat extended manner. If desired, the individual support clips 16 can be insulated and include multiple wires to conveniently make electrical contact with select portions of the sensor with the opposite ends in turn inserted directly into and making the required contact with the electronic circuit provided on the printed circuit board. This attachment to the circuit board 14 passing through the mirror 12 can provide a rigid support for the sensor 10.

The mirror 12 can be circular, elliptical, parabolic or any other geometrical shape. In the present embodiment, it is illustrated as being circular to provide the desired field of view and concentration of energy.

As can be seen in FIG. 2 electromagnetic energy E that is received by the mirror is reflected and concentrated at the focal point where the sensor is positioned. This is to say that the sensor and the supporting clips 16 are adjusted so that the electromagnetic energy E which is reflected by the surface of the mirror 12 is concentrated on the front surface 18 of the sensor 10.

It is to be understood that the source of energy if stationary is reflected to the surface 18 in a localized specific area or spot with little effect on the surrounding surface of the sensor 10. The importance of this feature will be explained later.

As an alternative the mirror can have an elongated configuration such as a segment of a cylinder which can be arranged parallel to the longitudinal axis of the sensor. In this way, any desired viewing area, focusing and concentration on the electromagnetic energy received by the reflector can be controlled.

The mirror can be mounted so that it is movable with respect to the sensor so that it can be pivoted or swiveled to adjust the area that is surveyed and observed by the sensor. The sensor 10 can also be provided in various other shapes such as rectangular which is illustrated in FIG. 1 or circular, square or any other desired configuration to fit the desired use. The only necessary changes that would have to be made would be in the arrangement of the pattern of the electrodes 20 which are provided on one of the surfaces of the device. It is also possible that since the sensor material is flexible, the overall surface of the sensor itself can be arranged either flat or curved, as desired.

FIG. 4 shows a cross-section of the structure of the infrared sensing device 10 according to the present invention. A pliable pyroelectric film material 22 such as polyvinyldine fluoride (PVF2) forms the base substrate for the sensor. A maximum thickness of approximately 12 microns has proven to be satisfactory. No solid material or heat sink is required in this invention which is quite different than that provided in most sensors. Up to this point, it has been necessary to build up the layers of the sensor on a rigid base material to provide the sufficient mass and rigidity which has been felt needed to stabilize the overall structure. The present invention overcomes these obstacles and is directed to a flexible and pliable energy sensor which can withstand flexure stresses without change or substantial damage. The material polyvinyldine fluoride (PVF2) which is described in U.S. Pat. No. 3,769,096 is actually one of a number of pyroelectric materials which can be utilized to fabricate this novel device. The surface 18 of the pyroelectric material 22 which is designated as the front of the sensor is essentially covered with a continuous overlay 24 of an electrically conductive material which forms an electrostatic shield and a conductor for one side of the radiation sensor. This electrode layer 24 can be applied by vacuum deposition or other suitable coating methods and usually has a thickness of approximately 400-1000 angstroms. Metallic materials such as nickel, chromium, copper, aluminum, gold and silver have been found suitable for this purpose.

Through masking, the alternating electrode pattern is formed on the rear surface of the pyroelectric material 22 by covering the surface in those areas which will later be left bare. Vapor deposition or coating of the electrode material is then provided over the rear surface and the mask is then removed. The masking process provides the alternate electrode configuration which is desired for ambient temperature compensation in the sensor and the varying output signal which can indicate radiation source movement. The configuration shown in FIG. 3 is only one of many configurations which can be provided to perform these functions. The electrode arrangement shown in FIG. 3 provides enlarged panel areas 26, 28 which can be provided in any numbers and arranged alternatively or any desired pattern across the surface of the pyroelectric material 22. Each of the corresponding electrode panels are interconnected in electrical series by conductors 30, 32, respectively to form an electrode group.

At this point, it should be stated that although two electrode groups are described it is possible to have any number of groups of electrodes and each group can have any number of individual electrodes as long as they all have equal signal response. One way this can be accomplished is by arranging the groups to have approximately the same surface area regardless of the number of electrodes within the individual groups. Various changes can be provided in the electronic circuitry to accommodate the number and arrangement of electrodes selected to produce the described novel results. As an alternative, it is possible that the location of the alternating and continuous electrodes can be reversed with the alternating electrodes applied to the front surface of the pyroelectric sensor material.

One of the primary functions provided in the present invention is the ability of the infrared energy sensing device to be capable of selecting a band of energy to which the sensor can be made sensitive. In the present invention a layer or coating of material 34 is applied to the front of the sensor which is the outer surface of the continuous electrode 24. This coating is selected from a group of selective absorbing materials which provide the desired filtering characteristic. The material selected should be essentially transparent or invisible to all wavelengths which are outside of the desired energy range to be sensed. This material can be any suitable material such as nitrocellulose, urethane, styrene or acrylic, which can be selected for the desired narrow band of energy absorption range which is desired.

FIGS. 5 and 6 show graphically the basic operation of the filtering characteristics of an infrared sensor according to the present invention. In this device the transparent layer 34 allows the energy received to pass directly through which allows it to strike the surface of the metallic continuous electrode 24. This metallic surface is naturally bright and reflective and reflects the energy reaching it back through the transparent layer so that it is dissipated. To enhance this reflecting capability the outer surface of the electrode 24 can be polished to a mirror like lustre or treated which will aid in this reflecting function.

As stated previously, the outer filter layer is selected for its characteristic of absorbing only a narrow band of desired radiated energy. For use in an intrusion detector it is desirable to be able to sense the presence of radiated infrared energy in the approximate range of 5 to 15 microns which is the range of heat energy which is given off by a human body. Clear lacquer, such as nitrocellulose, has this characteristic and exhibits the ability to absorb radiation in at least this narrow wavelength band. Thus, the application of a layer of clear lacquer on the outer surface of the continuous electrode 24 provides the desired function of sensing radiated energy for this purpose.

FIG. 6 illustrates the function wherein the energy B which lies within the desired wavelength band strikes the outer surface of the clear transparent layer 34. Due to the absorption characteristic of this layer the radiated energy is converted into heat energy by the material. All other extraneous energy outside of this selected band passes through this layer and is again reflected back into the atmosphere where it is dissipated. With the focusing of the energy striking the surface of the filter layer 34 significant localized heating is created in the filter layer which is transferred by conduction quickly into the metallic electrode 24 and from there into the surface of the pyroelectric material 22. This localized heating of the pyroelectric material 22 causes a differential electric charge to be formed on the adjacent surface of the pyroelectric material 22 which is picked up and conducted by the continuous electrodes 24 and corresponding electrode 26 or 28. As will be explained later, this localized concentration of heat and its position on the surface of the sensor can be used for identifying the actual movement or location of the original source of energy.

The clips 16 are bent in a U-shape so that the sensor 10 can be inserted within the U-shaped portion of the clip and securely held. These clips 16 can be fabricated from metallic wires and insulated where necessary to provide the desired electrical contact with the elements of the sensor. The opposite end of the clips can be soldered into the proper circuitry location on the printed circuit board 14 to provide the electrical connection between the sensor 10 and the remaining portion of the electronic circuit.

During operational use of the sensor according to the present invention, the infrared sensing device 10 is mounted at the focal point of the reflective mirror whereby radiant energy striking the mirror will be directed onto the surface of the infrared sensor. In an intrusion-type detector the area of detection that is important lies in a flat horizontal plane in front of the device. Thus, the plane that is to be observed allows the configuration of the infrared sensor to be arranged in an elongated rectangular configuration with the axis of the sensor arranged horizontally. In this way, energy striking the mirror is focused on the surface of the sensor generally along its longitudinal axis.

As a source of infrared energy in the horizontal plane that is being observed, passes in front of the mirror a varying output signal from the sensor will be generated. As the focused energy is aligned with one set of electrodes 26 or 28 the output voltage from that set of electrodes will be increased generally in a positive direction and applied to the input of the differential amplifier. The output from the other electrode set will remain essentially constant.

As shown in FIG. 7 as the energy source 40 moves to the left as shown by the arrow, the localized focus of the energy on the surface of the sensor moves to the right as illustrated. As this focus point F moves across the sensor in the axial direction the output from the electrode 26 returns to the original voltage. The output voltage from the other set of electrodes 28 will progessively increase as the focus point F of the energy approaches this electrode. As the focus point F crosses electrode 28 the output from that set of electrodes will again return to its original voltage with an increase again being observed in electrode 26 as the focus again approaches. The differential amplifier 46 inverts one of the input voltages so that the output from the amplifier 48 varies in polarity with the change in voltage input to the amplifier from the two separate sets of electrodes. This output varies in voltage polarity and time as the focus of the energy moves across the face of the sensor as illustrated in FIG. 8. In this way, the variation of the voltage and polarity of the output signal from the amplifier with respect to time can determine the relative size and the actual movement of an infrared generating source such as a human person passing in front of the infrared sensor. In this way, not just the presence of a source or object can be detected but also other characteristics of the object can be determined.

The electrical output from the differential amplifier 46 can be applied to a suitable electronic circuit to accomplish various purposes. Some of these can be the triggering of an alarm indicating the presence of an intruder which in turn can sound a bell, turn on a light, dial a telephone or actuate a signal in a remote location. Also, this sensor device can detect an emergency condition such as a fire which might exist in various locations of a manufacturing plant or other industrial area.

The alarm circuit to which the present energy sensor can be connected can be self-contained and operated by a signal battery power source. An additional circuit can be included to continuously monitor the battery energy level so that a distinctive alarm signal can be given if the voltage of the power source drops below a predetermined level.

As described herein the novel radiant energy sensor which is provided in the present invention is actually fabricated as a thin film member which has little mass. Due to its small size and thin characteristic a new and novel method of manufacturing and mounting the device has been developed.

Since the individual thin sensor elements are difficult to handle during manufacture and use, it has been found desirable to produce the sensors in a large number formed on a single sheet and then severed to form the individual units. In this arrangement, a thin film sheet of pyroelectric material can be mounted in a rigid outer framework for ease in handling. In this configuration the vacuum deposition of the continuous electrode and alternating array electrodes can be formed on their respective surfaces. In addition, the coating process for the selective absorption filter material can be easily applied.

In order to conveniently mount and use the sensor provided herein it has been found desirable to produce an injection molded sheet or matrix of individual sensor holders which has the same number of holders as sensors formed on the individual sheet material. In addition, the holders are sized and spaced to correspond to the radiant energy sensors formed.

The individual sensor holders are designed with an outer configuration which is desired for the use for which the sensors are intended with an inner central opening or slot provided to correspond to the desired working area of the sensor. With respect to the rectangular configuration of the sensor described herein, a rectangular holder having a generally rectangular open slot in the center portion is provided. The sides of the open slot can diverge outwardly away from the side on which the sensor is mounted to allow a clear field of view for the sensor during use. The holder can be molded from any synthetic resin or plastic material and can also be produced from an electrically conductive material to enhance the electrostatic shielding provided for the sensor.

During the fabrication of the holders and sensor, the surface of the holder matrix is coated with an adhesive material with the thin sheet of multiple sensors stretched taut and positioned properly over the holder matrix and secured with the absorption filter coating arranged next to the surface of the holder. In this way, it is intended to mount the holder and sensor so that the radiation striking the sensor passes through the slotted opening.

Once the sensor material is affixed to the matrix the individual holder and sensor material is severed from the sheet to form an individual sensor unit. A sensor cartridge which is designed to receive and secure the holder and properly position it can also be provided. These cartridges can be molded individually or as a matrix sheet for ease in handling and production. In addition, the sensor cartridge can be molded from electrically conductive or nonconductive synthetic resin or plastic materials as desired. In this type of application it is desired that the material be conductive to provide the electrostatic shielding and grounding of the sensor to the conductive enclosure.

As an alternative to the arrangement which has been previously described for mounting, the sensor cartridge with the inserted sensor and holder can have a mounting section including flange area and a shoulder for positioning on the edge of the printed circuit board. Corresponding tabs for electrically connecting the radiation sensor with the printed circuit are included. It is possible to use "Z" type compression connectors which are merely intermediate conductive connectors between the sensor and the printed circuit board to form a secure electrical connection between the components. Any type of removable or nonremovable fastener can be provided for securing the cartridge flange to the edge of the circuit board. In this way, a convenient, compact radiation sensor and circuit board for the corresponding electronic components can be easily formed to produce a complete sensor unit which can be assembled into various detector devices.

It has been found that the advantages utilized in the process for making and mounting the infrared radiation sensor according to the present invention provides substantial benefits as well as being unique. Thus, the process of making the sensor is considered to be an important part of the overall invention that is shown and described herein.

While an improved radiation sensing device has been shown and described in detail, it is to understood that this invention is not to be limited to the exact form disclosed, and that changes in detail and construction may be made in the invention without departing from the spirit thereof.

What is claimed is:

1. A method of making a infrared sensing device including the steps of:
   a. mounting a sheet of thin film pyroelectric material in a peripheral holding frame;
   b. forming a symetrical pattern of electrodes on both sides of said thin film material and properly aligning the respective electrodes on each side to form a plurality of individual infrared sensors;
   c. coating the entire outer surface of one side of said thin film material with a layer of energy absorbing material, said absorbing material being transparent to all energy outside of the infrared band but capable of absorbing and converting to heat energy all energy within this band;
   d. forming an equal number of sensor holders sized and symetrically positioned to correspond to and receive said plurality of infrared sensors, said holders being joined together in an integral matrix and each of said holders having a central opening formed therein;
   e. adhering the sheet of thin film to the surface of the holder matrix with the coated surface in contact with the surface of the matrix, said sheet being properly positioned so that each infrared sensor is precisely aligned with a holder and its central opening; and
   f. separating each holder and its attached infrared sensor from said matrix to form an individual infrared sensing device.

2. A method as described in claim 1 which includes the steps of forming a cartridge which is arranged to receive the infrared sensing device and
   inserting said sensing device into said cartridge so that it is securely held in desired position for mounting and electrically connecting to a printed circuit board.

3. A method as described in claim 2 which further includes the step of:
   arranging the electrode connectors for said infrared sensor so that they align with corresponding connectors on a printed circuit board so that when said cartridge is mounted on the printed circuit board the electrical connectors are automatically connected.

4. A method as described in claim 3 which further includes the step of inserting an intermediate connector means between the electrode connectors and the circuit board connectors to make positive electrical connection between the two upon mounting of the cartridge.

* * * * *